United States Patent
Dicks

(10) Patent No.: US 8,363,135 B2
(45) Date of Patent: Jan. 29, 2013

(54) METHOD AND DEVICE FOR RECONSTRUCTING A COLOR IMAGE

(75) Inventor: Andreas Dicks, Hamburg (DE)

(73) Assignee: NXP B.V., Eindhoven (NL)

( * ) Notice: Subject to any disclaimer, the term of this patent is extended or adjusted under 35 U.S.C. 154(b) by 227 days.

(21) Appl. No.: 12/865,866

(22) PCT Filed: Jan. 30, 2009

(86) PCT No.: PCT/IB2009/050373
§ 371 (c)(1),
(2), (4) Date: Aug. 3, 2010

(87) PCT Pub. No.: WO2009/098619
PCT Pub. Date: Aug. 13, 2009

(65) Prior Publication Data
US 2010/0321543 A1    Dec. 23, 2010

(30) Foreign Application Priority Data

Feb. 7, 2008   (EP) ..................... 08101386

(51) Int. Cl.
| | |
|---|---|
| H04N 9/083 | (2006.01) |
| H04N 3/14 | (2006.01) |
| H04N 5/335 | (2011.01) |
| H04N 9/04 | (2006.01) |
| H04N 5/228 | (2006.01) |
| H04N 5/208 | (2006.01) |
| H04N 9/07 | (2006.01) |
| G06K 9/00 | (2006.01) |
| G06K 9/40 | (2006.01) |

(52) U.S. Cl. ............... 348/280; 348/222.1; 348/252; 348/266; 348/272; 382/162; 382/167; 382/266

(58) Field of Classification Search ............. 348/222.1, 348/252, 266–283, 294, 297; 382/162–167, 382/254–269
See application file for complete search history.

(56) References Cited

U.S. PATENT DOCUMENTS 3,971,065 A    7/1976    Bayer
(Continued)

FOREIGN PATENT DOCUMENTS

| EP | 0 632 663 | 1/1995 |
|---|---|---|
| WO | 02/075654 A2 | 9/2002 |

OTHER PUBLICATIONS

Wu, X., et al; "Primary-Consistent Soft-Decision Color Demosaicking for Digital Cameras (Patent Pending)," IEEE Trans. on Image Processing, vol. 13, No. 9 (Sep. 1, 2004).

(Continued)

*Primary Examiner* — Jason Chan
*Assistant Examiner* — Michael Osinski

(57) ABSTRACT

A method for reconstructing a color image from a sensor which comprises a plurality of pixels arranged in a matrix of rows and columns is provided. The sensor is provided with a color filter array such that each pixel corresponds to one of three basic colors. The three basic colors are provided on the sensor in a predetermined pattern. The sensor outputs a detected value for each of the plurality of pixels. The method comprises the steps: for each of the plurality of pixels: accepting a detected value obtained for the corresponding one of the three basic colors and, for each of the respective two other basic colors, calculating a vertical interpolation value and a horizontal interpolation value and selecting either the vertical interpolation value or the horizontal interpolation value; outputting the accepted detected value and the selected interpolation values. The vertical interpolation and the horizontal interpolation are calculated based on the detected values for pixels in a 5×5 pixel environment around the respective pixel.

6 Claims, 4 Drawing Sheets

U.S. PATENT DOCUMENTS

| | | | |
|---|---|---|---|
| 5,373,322 A | 12/1994 | Laroche et al. | |
| 5,652,621 A | 7/1997 | Adams, Jr. et al. | |
| 6,570,616 B1 * | 5/2003 | Chen | 348/272 |
| RE42,555 E * | 7/2011 | Lin et al. | 348/252 |
| 2004/0150734 A1 * | 8/2004 | Sobel et al. | 348/272 |
| 2004/0179752 A1 | 9/2004 | Cheng et al. | |
| 2005/0146629 A1 * | 7/2005 | Muresan | 348/280 |
| 2005/0200733 A1 * | 9/2005 | Malvar | 348/272 |
| 2005/0201616 A1 * | 9/2005 | Malvar et al. | 382/167 |
| 2007/0002154 A1 * | 1/2007 | Kang et al. | 348/272 |
| 2007/0035637 A1 | 2/2007 | Feng et al. | |
| 2008/0066821 A1 * | 3/2008 | Komiya et al. | 138/110 |
| 2008/0240559 A1 | 10/2008 | Malvar | |

OTHER PUBLICATIONS

Kwan, C. et al. "A Classification Approach to Color Demosaicking", 2004 Int'l. Conf. on Image Processing, pp. 2415-2418 (Oct. 2004).
International Search Report for Int'l. Patent Appln. No. PCT/IB2009/050373 (Jul. 14, 2010).

* cited by examiner

Fig. 3

$$a) \begin{pmatrix} 0 & 0 & 0 & 0 & 0 \\ 0 & 0 & 0 & 0 & 0 \\ 0 & 0 & +1 & 0 & 0 \\ 0 & 0 & 0 & 0 & 0 \\ 0 & 0 & 0 & 0 & 0 \end{pmatrix}$$

$$b) \begin{pmatrix} 0 & 0 & 0 & 0 & 0 \\ 0 & 0 & 0 & 0 & 0 \\ -1/4 & +1/2 & +1/2 & +1/2 & -1/4 \\ 0 & 0 & 0 & 0 & 0 \\ 0 & 0 & 0 & 0 & 0 \end{pmatrix}$$

$$c) \begin{pmatrix} 0 & 0 & 0 & 0 & 0 \\ 0 & -1/4 & 0 & -1/4 & 0 \\ 0 & +1/2 & +1 & +1/2 & 0 \\ 0 & -1/4 & 0 & -1/4 & 0 \\ 0 & 0 & 0 & 0 & 0 \end{pmatrix}$$

$$d) \begin{pmatrix} 0 & 0 & 0 & 0 & 0 \\ -1/8 & +1/4 & +1/4 & +1/4 & -1/8 \\ -1/4 & +1/2 & +1/2 & +1/2 & -1/4 \\ -1/8 & +1/4 & +1/4 & +1/4 & -1/8 \\ 0 & 0 & 0 & 0 & 0 \end{pmatrix}$$

$$e) \begin{pmatrix} 0 & 0 & 0 & 0 & 0 \\ 0 & -1/4 & 0 & 0 & 0 \\ 0 & +1/2 & +1/2 & 0 & 0 \\ 0 & +1/2 & +1/2 & 0 & 0 \\ 0 & 0 & -1/4 & 0 & 0 \end{pmatrix}$$

$$f) \begin{pmatrix} 0 & 0 & 0 & 0 & 0 \\ 0 & 0 & -1/4 & +1/2 & 0 \\ 0 & 0 & +1 & 0 & 0 \\ 0 & 0 & -1/4 & +1/2 & 0 \\ 0 & 0 & 0 & 0 & 0 \end{pmatrix}$$

$$g) \begin{pmatrix} 0 & 0 & 0 & 0 & 0 \\ 0 & -1/8 & -1/4 & -1/8 & 0 \\ 0 & +1/4 & +1/2 & +1/4 & 0 \\ 0 & -1/4 & +1/2 & -1/4 & 0 \\ 0 & +1/4 & +1/2 & +1/4 & 0 \\ 0 & -1/8 & -1/4 & -1/8 & 0 \end{pmatrix}$$

Fig. 4

$$\begin{pmatrix} p_{11} & p_{12} & p_{13} & p_{14} & p_{15} \\ p_{21} & p_{22} & p_{23} & p_{24} & p_{25} \\ p_{31} & p_{32} & p_{33} & p_{34} & p_{35} \\ p_{41} & p_{42} & p_{43} & p_{44} & p_{45} \\ p_{51} & p_{52} & p_{53} & p_{54} & p_{55} \end{pmatrix}$$

Fig. 5 a) $\begin{pmatrix} . & . & a_{31} & . & . \\ . & . & b_{32} & . & . \\ . & . & a_{33} & . & . \\ . & . & b_{34} & . & . \\ . & . & a_{35} & . & . \end{pmatrix}$ b) $\begin{pmatrix} . & . & . & . & . \\ . & . & . & . & . \\ c_{13} & d_{23} & c_{33} & d_{43} & c_{53} \\ . & . & . & . & . \\ . & . & . & . & . \end{pmatrix}$

METHOD AND DEVICE FOR RECONSTRUCTING A COLOR IMAGE

FIELD OF THE INVENTION

The invention relates to a method and device for reconstructing a color image from a sensor provided with a color filter array (CFA).

BACKGROUND OF THE INVENTION

In recent years digital image acquisition has become more and more popular. In particular, acquisition of digital color images has found widespread use in many technical fields. Digital color images are usually acquired by acquiring images for three primary colors and combining these images to a color image. Usually, the three primary colors red, green, and blue are used (RGB). However, other primary colors such as cyan, yellow, magenta (CYM) are in principle possible as well. Thus, an ideal system for acquisition of color images requires three monochrome photo-sensitive elements per pixel of the image, i.e. a monochrome photo-sensitive element each for red, green, and blue in case of an RGB image. Each pixel of such an image thus consists of three components corresponding to the proportions of the primary colors or base colors. Due to economic reasons, use of a single sensor provided with a color filter array (CFA) has become widely accepted on the market. Each photosensitive element of such a sensor is provided with a primary color filter for one of the three primary colors and thus will only detect one of the three primary colors.

The most commonly known color filter array is the so-called Bayer RGB color filter array as e.g. disclosed in U.S. Pat. No. 3,971,065. In this color filter array, 50 percent of the photosensitive image elements comprise a green filter (G), while 25 percent comprise a red filter (R) and the remaining 25 percent comprise a blue filter (B). As a consequence, the missing proportions of primary colors of a pixel have to be interpolated from the surrounding pixels. Due to this, the image quality becomes deteriorated as compared to an arrangement of three independent color sensors per pixel since the color resolution is reduced. Furthermore, depending on the chosen method for interpolation, several image artifacts can occur which may deteriorate the overall appearance of the acquired image.

There can be found complex high-quality algorithms, on the one hand, and simpler methods which can be implemented in hardware having low complexity but do not provide satisfactory quality, on the other hand.

US 2004/0179752 A1 discloses a method for interpolating a full color image from an array of single color sensors. According to this method, first all green pixels are reconstructed and, based on this reconstruction, the red and blue pixels are reconstructed. Thus, a frame memory for storing data corresponding to a full frame is required to hold the full image to be reconstructed and to complete the image step by step.

OBJECT AND SUMMARY OF THE INVENTION

It is an object of the present invention to provide a method and device for reconstructing a color image which do not require a frame memory and allow the high quality of known complex methods to be achieved with resource-saving implementation in hardware.

This object is attained by the method according to claim 1. A method for reconstructing a color image from a sensor is provided. The sensor comprises a plurality of pixels arranged in a matrix of rows and columns. The sensor is provided with a color filter array such that each pixel corresponds to one of three basic colors, the three basic colors are provided on the sensor in a predetermined pattern. The sensor outputs a detected value for each of the plurality of pixels. The method comprises the following steps for each of the plurality of pixels: accepting a detected value obtained for the corresponding one of the three basic colors and, for each of the respective two other basic colors, calculating a vertical interpolation value and a horizontal interpolation value and selecting either the vertical interpolation value or the horizontal interpolation value; outputting the accepted detected value and the selected interpolation values; wherein the vertical interpolation value and the horizontal interpolation value are calculated based on the detected values for pixels in a 5×5 pixel environment around the respective pixel. Thus, for each pixel the two missing color values are interpolated both in the vertical direction and in the horizontal direction. Since the horizontal interpolation value and the vertical interpolation value for the missing color values are calculated based on detected values for pixels in a 5×5 environment around the pixel for which interpolation is to be performed, no frame memory is necessary but only four line memories suffice to provide the 5×5 environment for the filtering. Thus, a resource-saving hardware implementation using only four line memories is possible. Since both the vertical interpolation value and the horizontal interpolation value are calculated for all missing color values and the interpolation value to be accepted is selected from these calculated values, high quality interpolation for all color components is ensured.

Preferably, the step of selecting either the vertical interpolation value or the horizontal interpolation value comprises: calculating a horizontal edge indicator taking into account the horizontal interpolation value; calculating a vertical edge indicator taking into account the vertical interpolation value; and comparing the horizontal edge indicator and the vertical edge indicator. The horizontal edge indicator is calculated taking into account the horizontal interpolation value, i.e. the equation for calculating the horizontal edge indicator comprises the horizontal interpolation value. Similarly, the equation for calculating the vertical edge indicator comprises the vertical interpolation value. As a result, the interpolation of the missing color value which is finally accepted is improved.

According to an aspect, the horizontal edge indicator is calculated according to the equation $class_x = |a_{33}-a_{31}| + |a_{33}-a_{35}| + |B_{33}-b_{32}| + |B_{33}-b_{34}|$ with the pixels in the 5×5 pixel environment being defined as $$\begin{bmatrix} p_{11} & p_{12} & p_{13} & p_{14} & p_{15} \\ p_{21} & p_{22} & p_{23} & p_{24} & p_{25} \\ p_{31} & p_{32} & p_{33} & p_{34} & p_{35} \\ p_{41} & p_{42} & p_{43} & p_{44} & p_{45} \\ p_{51} & p_{52} & p_{53} & p_{54} & p_{55} \end{bmatrix}$$

the pixel $p_{33}$ being the pixel for which interpolation is performed, $a_{ij}$ and $b_{ij}$ being corresponding detected values for pixels $p_{ij}$, and $B_{33}$ being the horizontal interpolation value for pixel $p_{33}$ with respect to the same primary color as $b_{32}$ and $b_{34}$. This calculation of the horizontal edge indicator is particularly well-suited, since it takes into account the horizontal interpolation value $B_{33}$ for the respective color component.

According to an aspect, the vertical edge indicator is calculated according to the equation $class_y = |c_{33}-c_{13}| + |c_{33}-c_{53}| + |D_{33}-d_{23}| + |D_{33}-d_{43}|$ with $c_{ij}$ and $d_{ij}$ being corresponding detected values for pixels $p_{ij}$ and $D_{33}$ being the vertical interpolation value for pixel $p_{33}$ with respect to the same primary color as $d_{23}$ and $d_{43}$. This calculation of the vertical edge indicator is particularly well-suited, since it takes into account the vertical interpolation value $D_{33}$ for the respective color component. Thus, thus an appropriate basis for selection of the finally accepted interpolation color value is provided.

If the vertical interpolation value is selected if the equation $class_y < class_x$ is fulfilled and else the horizontal interpolation value is selected, the step of selection is easy to implement in hardware and the horizontal and vertical interpolation values are appropriately taken into account for during selection.

The object is also attained by a device for reconstructing a color image according to claim 6. The device comprises a sensor comprising a plurality of pixels arranged in a matrix of rows and columns. The sensor is provided with a color filter array such that each pixel corresponds to one of three basic colors. The three basic colors are provided on the sensor in a predetermined pattern. The sensor is adapted to output a detected value for each of the plurality of pixels. The device further comprises a reconstruction unit adapted to perform the following operations for each of the plurality of pixels: accepting a detected value obtained for the corresponding one of the three basic colors and, for each of the respective two other basic colors, calculating a vertical interpolation value and a horizontal interpolation value and selecting either the vertical interpolation value or the horizontal interpolation value; outputting the accepted detected value and the selected interpolation values; wherein the vertical interpolation value and the horizontal interpolation value are calculated based on the detected values for pixels in a 5×5 pixel environment around the respective pixel. Since the horizontal interpolation value and the vertical interpolation value for the missing color values are calculated based on detected values for pixels in a 5×5 environment around the pixel for which interpolation is to be performed, no frame memory is necessary but only four line memories suffice to provide the 5×5 environment for the filtering. Thus, a resource-saving hardware implementation using only four line memories is achieved. Since both the vertical interpolation value and the horizontal interpolation value are calculated for all missing color values and the interpolation value to be accepted is selected from these calculated values, high quality interpolation for all color components is ensured.

Preferably, the device comprises a plurality of line memories adapted to provide the 5×5 pixel environment to the reconstruction unit. Thus, no frame memory is necessary for the interpolation of missing color values and implementation in hardware having only low complexity is achieved. Further, the results of the interpolation are provided very fast.

If the reconstruction unit comprises a classification unit adapted to calculate a horizontal edge indicator taking into account the horizontal interpolation value and to calculate a vertical edge indicator taking into account the vertical interpolation value, edge classification and selection of the appropriate interpolation direction are improved as compared to reconstruction which does not take interpolated values into account.

Further features and advantages will become apparent from the following detailed description of an embodiment.

BRIEF DESCRIPTION OF THE DRAWINGS

The invention will be described in greater detail hereinafter, by way of non-limiting examples, with reference to the embodiments shown in the drawings.

FIGS. 3a to 3g illustrate filter kernels used in the embodiment.

FIG. 4 illustrates a 5×5 pixel environment around a central pixel.

FIG. 5a is an illustration for explaining calculation of a horizontal edge indicator.

FIG. 5b is an illustration for explaining calculation of a vertical edge indicator.

DESCRIPTION OF EMBODIMENTS

Figure 1:
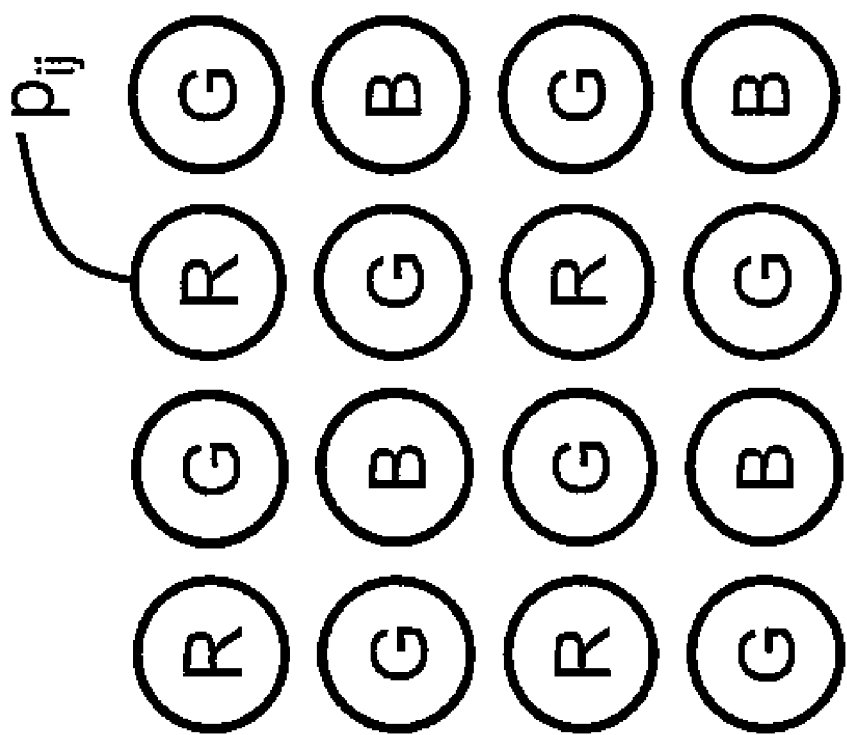
FIG. 1 is a schematic illustration of a color filter array used in the embodiment.

An embodiment of the present invention will now be described with reference to FIGS. 1 to 5. The device 1 for reconstructing a color image according to the embodiment comprises a sensor 2 which is provided with a color filter array (CFA). The sensor 2 comprises a plurality of pixels $p_{ij}$ arranged in a matrix of rows and columns. The sensor 2 comprises a large number of rows $N_r$ and a large number of columns $N_c$ and thus a large number of pixels $N_r \times N_c$. The color filter array (CFA) is arranged such that each pixel is sensitive to one of the primary colors or base colors red, green, and blue. The pattern in which the color filter array is arranged is shown in FIG. 1 for a portion of the sensor 2 comprising 4×4 pixels. As can be seen in FIG. 1, the color filter array is a so-called Bayer RGB color filter array. In FIG. 1, red pixels are marked by R, green pixels by G, and blue pixels by B. There are rows in which red pixels and green pixels are alternately arranged (RG rows) and rows in which blue pixels and green pixels are alternately arranged (BG rows). The RG rows and the BG rows are arranged such that columns are formed in which red pixels and green pixels are alternately arranged (RG columns) and columns are formed in which blue pixels and green pixels are alternately arranged (BG columns). It should be noted that FIG. 1 only shows a portion of the color filter array which further extends in the horizontal direction and in the vertical direction with the described pattern. Thus, 50 percent of the pixels are sensitive to green (G), 25 percent are sensitive to red (R), and 25 percent are sensitive to blue (B). The sensor 2 is constructed for acquiring a color image upon illumination with light, for example the sensor 2 is a CCD sensor of a digital photo camera. If for example red light irradiates a pixel sensitive to red light (R) with certain intensity and for a certain time, the pixel will output a value corresponding to this irradiation.

As has been described in the introductory portion, since the sensor is provided with the color filter array, there is a need to interpolate the red value and the blue value for the green pixel. Similarly, there is a need to interpolate the green value and the blue value for the red pixel and to interpolate the green value and the red value for the blue pixel. In the following it will be described how this interpolation of color values which cannot be directly detected is performed according to the embodiment.

According to the embodiment, the method for interpolation according to the embodiment strictly operates on a 5×5 environment around the pixel for which interpolation is performed. The method is a heuristic method based on a combination of linear filters which is applied on a 5×5 environment of the respective pixel in a situation dependent way. According to this method, all missing color components are computed simultaneously to reduce the demands with respect to memory on the hardware implementation.

Figure 2:
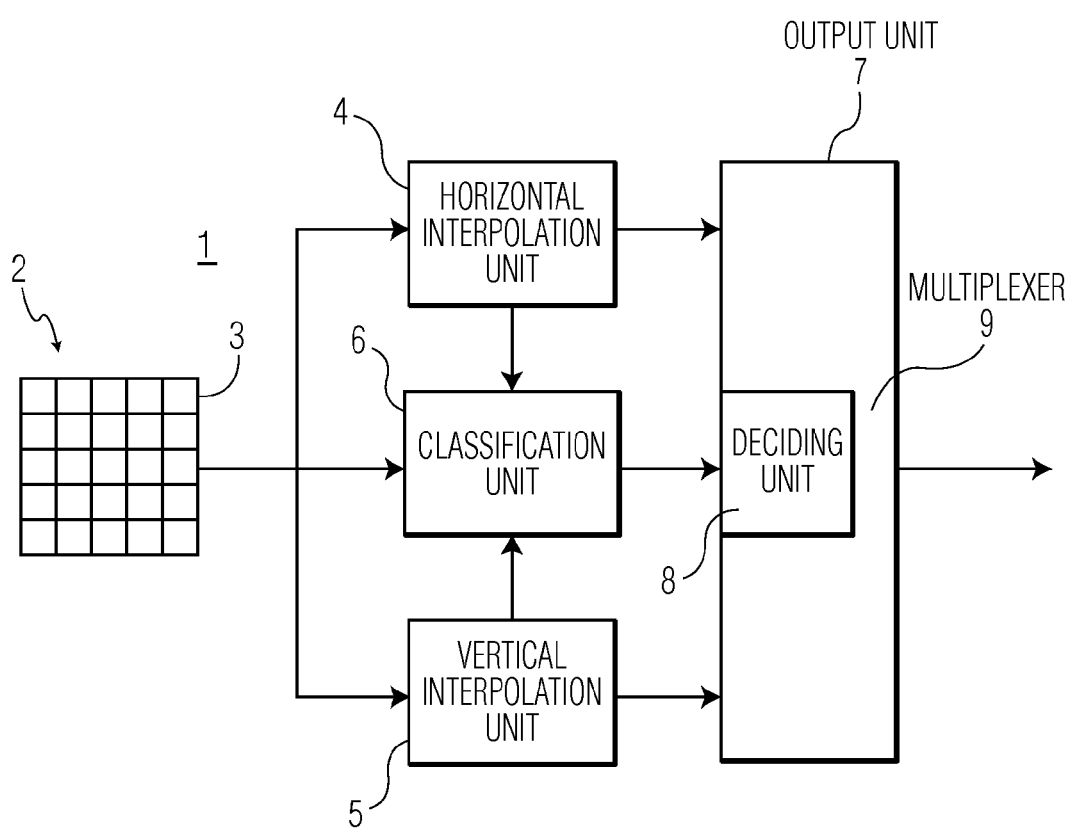
FIG. 2 is a schematic illustration of a device for reconstructing a color image according to an embodiment.

As schematically indicated in FIG. 2, detected pixel values of a 5×5 environment 3 around a pixel to be interpolated are simultaneously provided to a horizontal interpolation unit 4, to a vertical interpolation unit 5, and to a classification unit 6. The 5×5 environment of pixels 3 is schematically shown in FIG. 4. In FIG. 4, the pixel for which interpolation has to be performed is the central pixel marked by $p_{33}$ and the pixels in the 5×5 environment are indicated as pixels $p_{ij}$ as in a mathematical matrix with i indicating the row index and j indicating the column index. Outputs of the horizontal interpolation unit 4 and the vertical interpolation unit 5 are provided to the classification unit 6. Further, outputs of the horizontal interpolation unit 4, the vertical interpolation unit 5, and the classification unit 6 are provided to an output unit 7 comprising a deciding unit 8 and a multiplexer 9. The horizontal interpolation unit 4, the vertical interpolation unit 5, the classification unit 6, and the output unit 7 together form a reconstruction unit.

FIGS. 3a to 3g schematically illustrate filter kernels used in the horizontal interpolation unit 4 and in the vertical interpolation unit 5, respectively. In this illustration, the values in the filter kernels are arranged in a 5×5 matrix too and the respective values indicated in the matrix are factors to be used in the interpolation process for the respective detected values of corresponding pixels $p_{ij}$ in the 5×5 environment 3. In the following, the abbreviations $x_{ij}$ (or $a_{ij}$, $b_{ij}$, $c_{ij}$, and $d_{ij}$) (with $0 \leq i, j \leq 5$) will be used to specify detected values at pixels $p_{ij}$. The distinction between a and b or c and d will be used to indicate that the respective detected values correspond to different colors.

Interpolation at Red Pixel

If for example, the central pixel $p_{33}$ is a red pixel, interpolation has to be performed for the corresponding blue value and for the corresponding green value. Since the red value for the central pixel $p_{33}$ is detected, this value is accepted by applying the filter kernel shown in FIG. 3a. This means, the value for the central pixel $p_{33}$ (in this case the detected red value) is multiplied by +1 and output to the output unit 7.

In order to determine the green value for the central pixel, both a horizontal interpolation and a vertical interpolation are performed. The horizontal interpolation is performed in the horizontal interpolation unit 4 and the vertical interpolation is performed in the vertical interpolation unit 5. For the horizontal interpolation, the filter kernel shown in FIG. 3b is used. This means the detected value $x_{31}$ at pixel $p_{31}$ is multiplied by −¼, the detected value $x_{32}$ at $p_{32}$ by ½, the detected value $x_{33}$ at $p_{33}$ by ½, the detected value $x_{34}$ at $p_{34}$ by ½, and the detected value $x_{35}$ at $p_{35}$ by −¼. The obtained values are added to obtain the horizontal interpolation for the green value at pixel $p_{33}$ according to:

$-1/4 * x_{31} + 1/2 * x_{32} + 1/2 * x_{33} + 1/2 * x_{34} - 1/4 * x_{35}$.

In a similar way, the vertical interpolation is performed using the filter kernel shown in FIG. 3e. I.e. the vertical interpolation of the green value for the central red pixel is calculated according to $-1/4 * x_{13} + 1/2 * x_{23} + 1/2 * x_{33} + 1/2 * x_{43} - 1/4 * x_{53}$.

In a similar way, the horizontal interpolation of the blue value at the red pixel is performed using the filter kernel shown in FIG. 3d and the vertical interpolation of the blue value at the red pixel is performed using the filter kernel shown in FIG. 3g.

Interpolation at Blue Pixel

If the central pixel $p_{33}$ is a blue pixel, the detected blue value is accepted using the filter kernel shown in FIG. 3a. In this case, the red value and the green value for this pixel have to be interpolated. Again, both horizontal and vertical interpolations are performed for the missing values. The horizontal interpolation of the red value is performed in the horizontal interpolation unit 4 using the filter kernel shown in FIG. 3d, and the vertical interpolation of the red value is performed in the vertical interpolation unit 5 using the filter kernel shown in FIG. 3g.

For the horizontal interpolation of the green value, the filter kernel shown in FIG. 3b is used and, for the vertical interpolation of the green value, the filter kernel shown in FIG. 3e is used.

Interpolation at Green Pixel

If the central pixel $p_{33}$ is a green pixel, the detected green value is accepted using the filter kernel of FIG. 3a. The missing red and blue values have to be interpolated. Again, for each missing color value vertical and horizontal interpolations are performed.

For vertical interpolation of the red value in an RG column, the filter kernel of FIG. 3e is used, and in a BG column, the filter kernel of FIG. 3f is used. For horizontal interpolation of the red value in an RG row, the filter kernel of FIG. 3b is used, and for horizontal interpolation in a BG row the filter kernel of FIG. 3c is used.

For vertical interpolation of a blue value in a BG column, the filter kernel of FIG. 3e is used, and in an RG column, the filter kernel of FIG. 3f is used. For horizontal interpolation of the blue value in a BG row, the filter kernel of FIG. 3b is used, and for horizontal interpolation in an RG row, the filter kernel of FIG. 3c is used.

Thus, actually detected color values for a pixel are accepted in each case and, for missing color values, both vertical and horizontal interpolations are performed. The used filter functions are provided as horizontally oriented functions and as vertically oriented functions and thus correspond to horizontally weighted interpolations and vertically weighted interpolations, respectively. To summarize, the filter kernels illustrated in FIG. 3 are used as follows:

The filter kernel of FIG. 3a is used for accepting existing red, green, or blue values.

The filter kernel of FIG. 3b is used for horizontal interpolation of green values at red or blue positions; for horizontal interpolation of red at a green position in an RG row; and for horizontal interpolation of blue at a green position in a BG row.

The filter kernel of FIG. 3c is used for horizontal interpolation of red at a green position in a BG row; and for horizontal interpolation of blue at a green position in an RG row.

The filter kernel of FIG. 3d is used for horizontal interpolation of red at a blue position and for horizontal interpolation of blue at a red position.

The filter kernel of FIG. 3e is used for vertical interpolation of green at a red or blue position; for vertical interpolation of red at a green position in an RG column; and for vertical interpolation of blue at a green position in a BG column.

The filter kernel of FIG. 3f is used for vertical interpolation of blue at a green position in a RG column; and for vertical interpolation of red at a green position in a BG column.

The filter kernel of FIG. 3g is used for vertical interpolation of red at a blue position; and for vertical interpolation of blue at a red position.

In FIG. 3, the filter kernels are represented in a matrix arrangement. However, the filter is applied in such a way that the value in the respective position $f_{ij}$ in the filter kernel is used to multiply the corresponding detected value $x_{ij}$ of the 5×5 environment 3 of pixels and the resulting products are added to provide the interpolated value, i.e. the following sum is calculated:

$$\sum_{i,j=1,\ldots,5} f_{ij} x_{ij}.$$

The horizontal interpolation unit 4 and the vertical interpolation unit 5 provide the respective interpolation values as outputs to the classification unit 6 and to the output unit 7.

According to the embodiment, further, edge-sensitive interpolation along object boundaries contained in the image is performed with respect to the vertical and horizontal directions. This is done to prevent color artifacts from occurring in the reconstructed images. Only image points which are correlated are used in the interpolation which is finally used for image reconstruction. This will be described in the following.

The classification unit 6 is adapted to provide a decision whether the result of the horizontal interpolation by the horizontal interpolation unit 4 or the result of the vertical interpolation by the vertical interpolation unit 5 is to be used as the final result for the interpolated red, green, and blue values. The classification unit 6 detects edges in the horizontal or vertical direction. To achieve this, two edge indicators are calculated, a horizontal edge indicator class and a vertical edge indicator $class_y$. The horizontal and vertical edge indicators class and $class_y$ are calculated from image environments of 5 pixels aligned correspondingly, as will be described with respect to FIGS. 5a and 5b.

In FIG. 5a, the detected values $x_{ij}$ for a row including the central pixel $p_{33}$ are denoted by $a_{31}$, $b_{32}$, $a_{33}$, $b_{34}$, and $a_{35}$; a and b being used to indicate the respective base colors red and green or blue and green of the pixels in the row. Similarly, in FIG. 5b the detected values $x_{ij}$ for a column including the central pixel $p_{33}$ are denoted by $c_{13}$, $d_{23}$, $c_{33}$, $d_{43}$, $c_{53}$; c and d used to indicate the respective base colors red and green or blue and green of the pixels in the column. Furthermore, the horizontal interpolation value for the respective color for pixel $p_{33}$ is designated as $B_{33}$ and the vertical interpolation value for the respective color for pixel $p_{33}$ is designated as $D_{33}$. I.e. $B_{33}$ is the horizontal interpolation value for the color component b of the central pixel and $D_{33}$ is the vertical interpolation value for the color component d of the central pixel $p_{33}$. According to the embodiment, the horizontal edge indicator class is calculated according to the equation:

$$class_x = |a_{33} - a_{31}| + |a_{33} - a_{35}| + |B_{33} - b_{32}| + |B_{33} - b_{34}|$$

and the vertical edge indicator $class_y$ is calculated according to the equation:

$$class_y = |c_{33} - c_{13}| + |c_{33} - c_{53}| + |D_{33} - d_{23}| + |D_{33} - d_{43}|.$$

Comparison between the edge indicators class and $class_y$ determines the final interpolation direction which is used. If the value of the computed vertical edge indicator is less than the value of the computed horizontal edge indicator ($class_y < class_x$) the vertical interpolation color values are accepted as final result, else the reconstruction result is provided by the horizontal interpolation color values. The resulting final values are output by the output unit 7. In the device according to the embodiment, the classification unit 6 delivers the respective edge indicators class and $class_y$, the deciding unit 8 carries out the comparison ($class_y < class_x$), and the multiplexer 9 selects the horizontal or vertical interpolation values for output accordingly.

As a result, according to the embodiment a full RGB image is reconstructed from a Bayer sensor image. By means of the disclosed linear filters (shown in FIGS. 3a to 3g) missing color components are horizontally and vertically reconstructed in one single step per pixel. The final reconstruction result is selected from the horizontal interpolation color value and the vertical interpolation color value by means of the edge indicators class and $class_y$ as defined above. Thus, the image reconstruction system combines the high quality of known complex methods with a resource-saving possibility of implementation in hardware. It is particularly well-suited for fields of application in which the results of the image reconstruction have to be presented as soon as possible. This is e.g. the case in video applications.

Since the proposed method and system strictly operate on a 5×5 environment of the source image in the Bayer format and all missing color components are simultaneously computed, the demands on memory in hardware implementation are reduced. Instead of a full image memory in cases in which e.g. a green layer is first completely calculated, according to the embodiment only four line memories are necessary to provide the 5×5 environment to the subsequent filtering.

In the calculation of the vertical edge indicator $class_y$ and the horizontal edge indicator $class_x$, values which have already been interpolated ($B_{33}$ and $D_{33}$) are used. Due to this, the interpolation leads to significantly better results as compared to interpolations which do not take values into account that have been interpolated before. The disclosed filter kernels are particularly well suited for resource-saving implementation in hardware due to the selected coefficients.

Although it has been described with respect to the embodiment that the horizontal interpolation unit 4, the vertical interpolation unit 5, and the classification unit 6 are described as separate units, integration in one unit is possible. Further, integration with the output unit 7 is possible as well.

With respect to the filter kernels, it is also possible to use filter kernels in which all values $f_{ij}$ are multiplied by a certain factor, while the proportions between the respective values for $f_{ij}$ are maintained.

A skilled person will understand that pixels located at the boundary of the matrix of rows and columns have to be treated in a slightly different way.

The invention claimed is:

1. A method for reconstructing a color image from a sensor comprising a plurality of pixels arranged in a matrix of rows and columns, the sensor being provided with a color filter array such that each pixel corresponds to one of three basic colors, the three basic colors being provided on the sensor in a predetermined pattern; wherein the sensor outputs a detected value for each of the plurality of pixels;

the method comprising:
for each of the plurality of pixels:
accepting a detected value obtained for the corresponding one of the three basic colors and, for each of the respective two other basic colors, calculating a vertical interpolation value and a horizontal interpolation value and selecting either the vertical interpolation value or the horizontal interpolation value comprises calculating a horizontal edge indicator taking into account the horizontal interpolation value;

calculating a vertical edge indicator taking into account the vertical interpolation value; and comparing the horizontal edge indicator and the vertical edge indicator where the horizontal edge indicator is calculated according to the equation $$class_x = |a_{33} - a_{31}| + |a_{33} - a_{35}| + |B_{33} - b_{32}| + |B_{33} - b_{34}|$$

with the pixels in the 5×5 pixel environment being defined as $$\begin{bmatrix} p_{11} & p_{12} & p_{13} & p_{14} & p_{15} \\ p_{21} & p_{22} & p_{23} & p_{24} & p_{25} \\ p_{31} & p_{32} & p_{33} & p_{34} & p_{35} \\ p_{41} & p_{42} & p_{43} & p_{44} & p_{45} \\ p_{51} & p_{52} & p_{53} & p_{54} & p_{55} \end{bmatrix}$$

the pixel $p_{33}$ being the pixel for which interpolation is performed, $a_{ij}$ and $b_{ij}$ being corresponding detected values for pixels $p_{ij}$, and $B_{33}$ being the horizontal interpolation value for pixel $p_{33}$;

outputting the accepted detected value and the selected interpolation values;
wherein the vertical interpolation value and the horizontal interpolation value are calculated based on the detected values for pixels in a 5×5 pixel environment around the respective pixel.

2. The method according to claim 1, wherein the vertical edge indicator is calculated according to the equation $$\text{class}_y = |c_{33}-c_{13}|+|c_{33}-c_{53}|+|D_{33}-d_{23}|+|D_{33}-d_{43}|$$

with $c_{ij}$ and $d_{ij}$ being corresponding detected values for pixels $p_{ij}$ and $D_{33}$ being the vertical interpolation value for pixel $p_{33}$.

3. The method according to claim 2, wherein the vertical interpolation value is selected if the following equation is fulfilled:

$$\text{class}_y < \text{class}_x,$$

and else the horizontal interpolation value is selected.

4. A device for reconstructing a color image, the device comprising:
a sensor comprising a plurality of pixels arranged in a matrix of rows and columns, the sensor being provided with a color filter array such that each pixel corresponds to one of three basic colors, the three basic colors being provided on the sensor in a predetermined pattern; the sensor being adapted to output a detected value for each of the plurality of pixels;
a plurality of line memories; and
a reconstruction unit adapted to perform the following operations for each of the plurality of pixels wherein the reconstruction unit comprises a classification unit adapted to calculate a horizontal edge indicator taking into account the horizontal interpolation value and to calculate a vertical edge indicator taking into account the vertical interpolation value and the horizontal edge indicator is calculated according to the equation $$\text{class}_x = |a_{33}-a_{31}|+|a_{33}-a_{35}|+|B_{33}-b_{32}|+|B_{33}-b_{34}|$$

with the pixels in the 5×5 pixel environment being defined as $$\begin{bmatrix} p_{11} & p_{12} & p_{13} & p_{14} & p_{15} \\ p_{21} & p_{22} & p_{23} & p_{24} & p_{25} \\ p_{31} & p_{32} & p_{33} & p_{34} & p_{35} \\ p_{41} & p_{42} & p_{43} & p_{44} & p_{45} \\ p_{51} & p_{52} & p_{53} & p_{54} & p_{55} \end{bmatrix}$$

the pixel $p_{33}$ being the pixel for which interpolation is performed, $a_{ij}$ and $b_{ij}$ being corresponding detected values for pixels $p_{ij}$, and $B_{33}$ being the horizontal interpolation value for pixel $p_{33}$:
accepting a detected value obtained for the corresponding one of the three basic colors and, for each of the respective two other basic colors, calculating a vertical interpolation value and a horizontal interpolation value and selecting either the vertical interpolation value or the horizontal interpolation value;
outputting the accepted detected value and the selected interpolation values;
wherein the vertical interpolation value and the horizontal interpolation value are calculated based on the detected values for pixels in a 5×5 pixel environment that is provided by the plurality of line memories to the reconstruction unit around the respective pixel.

5. The device of claim 4, wherein the vertical edge indicator is calculated according to the equation $$\text{class}_y = |c_{33}-c_{13}|+|c_{33}-c_{53}|+|D_{33}-d_{23}|+|D_{33}-d_{43}|$$

with $c_{ij}$ and $d_{ij}$ being corresponding detected values for pixels $p_{ij}$ and $D_{33}$ being the vertical interpolation value for pixel $p_{33}$.

6. The device of claim 5, wherein the vertical interpolation value is selected if the following equation is fulfilled:

$$\text{class}_y < \text{class}_y,$$

and else the horizontal interpolation value is selected.

\* \* \* \* \*